United States Patent
Morehead (10) Patent No.: US 9,447,882 B2
(45) Date of Patent: Sep. 20, 2016

(54) COMPRESSION-LIMITED GASKET CONSTRUCTION

(75) Inventor: Mason D. Morehead, Spartanburg, SC (US)

(73) Assignee: Parker-Hannifin Corporation, Cleveland, OH (US)

( * ) Notice: Subject to any disclaimer, the term of this patent is extended or adjusted under 35 U.S.C. 154(b) by 589 days.

(21) Appl. No.: 12/425,553

(22) Filed: Apr. 17, 2009

(65) Prior Publication Data

US 2009/0261532 A1 Oct. 22, 2009

Related U.S. Application Data

(60) Provisional application No. 61/045,686, filed on Apr. 17, 2008.

(51) Int. Cl.
*F16J 15/02* (2006.01)

(52) U.S. Cl.
CPC .................................. *F16J 15/027* (2013.01)

(58) Field of Classification Search
CPC ...... F16J 15/123; F16J 15/127; F16B 5/0258
USPC ................ 277/312, 315, 630, 639, 593, 598
See application file for complete search history.

(56) References Cited

U.S. PATENT DOCUMENTS

| | | | | |
|---|---|---|---|---|
| 810,430 | A * | 1/1906 | Pfluger | 16/2.3 |
| 1,635,313 | A * | 7/1927 | Dieterich | 411/135 |
| 1,985,473 | A * | 12/1934 | Victor | 277/593 |
| 2,583,719 | A * | 1/1952 | White | 16/2.1 |
| 3,231,288 | A * | 1/1966 | Hensien | 277/639 |
| 4,165,082 | A * | 8/1979 | Foucras et al. | 277/637 |
| 4,204,691 | A * | 5/1980 | Takase et al. | 277/591 |
| 4,232,496 | A * | 11/1980 | Warkentin | 403/288 |
| 4,346,004 | A * | 8/1982 | Foucras et al. | 210/232 |
| 4,372,701 | A * | 2/1983 | Watanabe | 403/24 |
| 4,381,869 | A * | 5/1983 | Abbes et al. | 277/639 |
| 4,441,724 | A * | 4/1984 | Taylor | 277/640 |
| 4,535,996 | A | 8/1985 | Cardis et al. | |
| 4,535,999 | A * | 8/1985 | Locacius | 277/596 |
| 4,730,836 | A * | 3/1988 | Miller et al. | 277/598 |
| 4,756,561 | A * | 7/1988 | Kawata et al. | 285/187 |
| 4,850,521 | A | 7/1989 | Servant | |
| 5,282,303 | A | 2/1994 | Schriever | |
| 5,513,603 | A * | 5/1996 | Ang et al. | 123/90.37 |
| 5,605,342 | A | 2/1997 | Genin et al. | |

(Continued)

FOREIGN PATENT DOCUMENTS

| | | |
|---|---|---|
| EP | 1726852 A2 | 11/2006 |
| JP | 03-050366 | 4/1991 |
| JP | 2005-214369 | 11/2005 |

OTHER PUBLICATIONS

Fasnap Corp. literature entitled "Grommets and Washers", Version 1.6 dated Mar. 30, 2008.

*Primary Examiner* — Kipp Wallace
(74) *Attorney, Agent, or Firm* — John A. Molnar, Jr.

(57) ABSTRACT

Sealing gasket construction for providing a fluid seal intermediate a pair of opposed, mating parts or structures. The gasket includes a body formed of a resilient material, and one or more integral compression limiters each received in a corresponding aperture formed through the body. Each of the limiters is formed of a rigid material and extends through the body from a first flanged portion to a second flanged portion with the body being clamping therebetween.

16 Claims, 6 Drawing Sheets

(56) References Cited

U.S. PATENT DOCUMENTS

| | | |
|---|---|---|
| 5,636,850 A | 6/1997 | Kashmerick |
| 5,735,532 A | 4/1998 | Nolan et al. |
| 6,006,423 A | 12/1999 | Schriever |
| 6,015,152 A | 1/2000 | Swensen et al. |
| 6,039,323 A | 3/2000 | Mackenhaput et al. |
| 6,092,811 A | 7/2000 | Bojarczuk et al. |
| 6,367,803 B1 | 4/2002 | Loth |
| 6,502,829 B2 | 1/2003 | Watanabe et al. |
| 6,609,717 B2 | 8/2003 | Hinson |
| 6,705,149 B2 * | 3/2004 | Cobzaru et al. ............. 72/391.4 |
| 6,869,081 B1 | 3/2005 | Jenco |
| 7,306,235 B2 | 12/2007 | Roberts et al. |
| 2004/0160018 A1 | 8/2004 | Dupont et al. |
| 2006/0232066 A1 | 10/2006 | Kanagae et al. |
| 2007/0222164 A1 | 9/2007 | Yasuki |
| 2009/0229087 A1 * | 9/2009 | Schneider ...................... 24/197 |

* cited by examiner

COMPRESSION-LIMITED GASKET CONSTRUCTION

CROSS-REFERENCE TO RELATED CASES

The present application claims the benefit of the filing date of U.S. Provisional Application Ser. No. 61/045,686, filed Apr. 17, 2008, the disclosure of which is expressly incorporated herein by reference.

BACKGROUND OF THE INVENTION

The present invention relates broadly to a gasket construction for providing a fluid seal intermediate a pair of opposed, mating parts or structures, and more particularly to such a construction which includes integral torque or other compression limiters.

"Picture frame"-type spliced gaskets are used in various commercial, industrial, aerospace, and military applications. As clamped, bolted, or otherwise compressed between the opposing or faying surfaces of a pair of mating parts or structures, the gasket provides a fluid-tight seal thereof. In service, the gasket is clamped between the mating surfaces to effect the compression and deformation of the seal member and to develop a fluid-tight interface with each of those surfaces.

Figure 1:
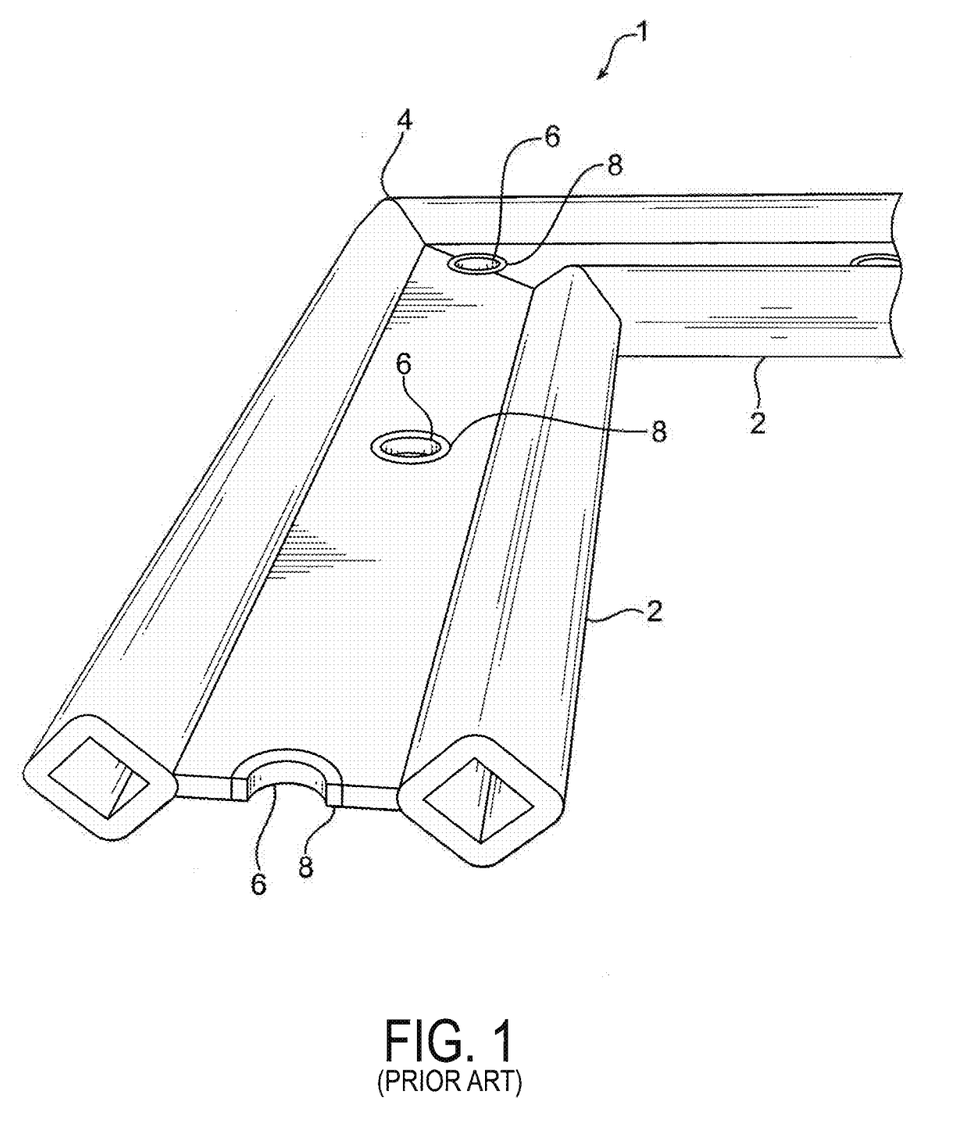
FIG. 1 is a topside perspective view in end cross-section of a compression-limited picture frame-type gasket construction illustrative of the prior art.

As shown generally at 1 in FIG. 1, gaskets of the type herein involved are constructed from strips 2 of an extruded, molded, or otherwise fabricated seal profile formed of an elastomer, such as a fluoroelastomer like an FKM. These strips 2 are spliced, such as at the corners 4 to form the closed "picture frame" shape of the gasket 1. Previously these gaskets 1 have been constructed with a number of stainless steel or other metal cylinders 6 which were each glued into a corresponding hole 8 punched through the thickness profile of the strips 2. In use, the cylinders 6 function as built-in torque or other compression limiters which limit the compression of the gasket 10 so as, for example, to prevent the over-compression of the gasket to an extent which could compromise the fluid seal.

Current torque limiters are believed to be custom-manufactured and therefore Relatively expensive. Quality issues are also believed to result from the limiters 6 having to be glued, typically with a cyanoacrylate-based adhesive, into the holes 8. In this regard, it is well-known that bonding metals to rubber and other elastomers, and particularly to fluoroelastomers such as FKM, is problematic. The use of adhesives also presents certain health and environmental concerns, and may restrict the use of the gasket in certain applications as the adhesive may have a lower service temperature and/or resistance to certain chemicals and other media than the fluoroelastomer material itself. It therefore is believed that a compression-limited gasket construction offering an alternative to glue-in compression limiters would be well-received in the field.

BROAD STATEMENT OF THE INVENTION

The present invention is directed to a compression-limited gasket. The gasket which may be of an extruded and spliced "picture frame"-type includes one or more integral torque or other compression limiters which function to limit the over-compression of the gasket when it is compressed between the opposing or faying surfaces of a pair of mating parts or structures.

Unlike constructions employing the glued-in limiters previously known in the art, the gasket of the present invention features limiters which are pressed or otherwise mechanically fastened onto the body of the gasket. That is, by providing the limiters as having flanged ends, the body of the gasket may be clamped between the ends to thereby affix the limiters without the use of adhesives and the aforementioned problems associated therewith. Such clamping more rigidly attaches the limiters to the gasket to reduce the potential for fall-out. When clamped at a corner or otherwise through one of the splices of the gasket, the limiter may strengthen the gasket.

The present invention, accordingly, comprises the construction, combination of elements, and/or arrangement of parts and steps which are exemplified in the detailed disclosure to follow. Advantageously, if provided in the form of a grommet, the limiters may be more inexpensively commercially purchased rather than having to be custom-made. Such grommets, moreover, may be installed using a simple mechanical press.

These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For purposes of illustration, the precepts of the compression-limited gasket construction are described principally in connection with its configuration as an extruded and spliced "picture frame"-type for use as a seal between a pair of mating surfaces such as within in a port, window, access panel, or other such assembly. In view of the discourse to follow, however, it will be appreciated that aspects of the present invention may find utility in other fluid sealing applications requiring a gasket of the type herein involved. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, shown generally at 10 in the topside perspective view of FIG. 1 is a representative embodiment according to the present invention of a compression-limited gasket construction configured for interposition, for example, between a pair of mutually-opposed interfacing surfaces. In basic construction, gasket 10 includes a resilient body, 12, and a number of rigid torque or other compression limiters, commonly referenced at 20. Each of the compression limiters 20 may be received in a corresponding aperture, commonly reference at 22, punched or otherwise formed through the thickness dimension of the body 12.

Although body 12 may be in the form of a linear, rectilinear or curvilinear strip or other shape, for many applications body 12 may be provided in the picture frame configuration shown. In such configuration, body 12 has a lengthwise extent with the limiters 20 and corresponding apertures 22 being disposed in a linear or other series along the lengthwise extent. Such lengthwise extent defines a generally polygonal or other closed geometry having an inner perimeter, 24, an outer perimeter, 26, and corners 28a-d. The inner and outer perimeters 24 and 26 enclose an interior opening, 29, and otherwise define, respectively, the inner and outer diametric extents of the body 12 which generally may be sized such that the gasket 10 is receivable intermediate the interfacing surfaces to be sealed, with the opening 29 sized, for example, for registration with a corresponding opening in one or both of the surfaces or other part of the assembly to be sealed.

Figure 2:
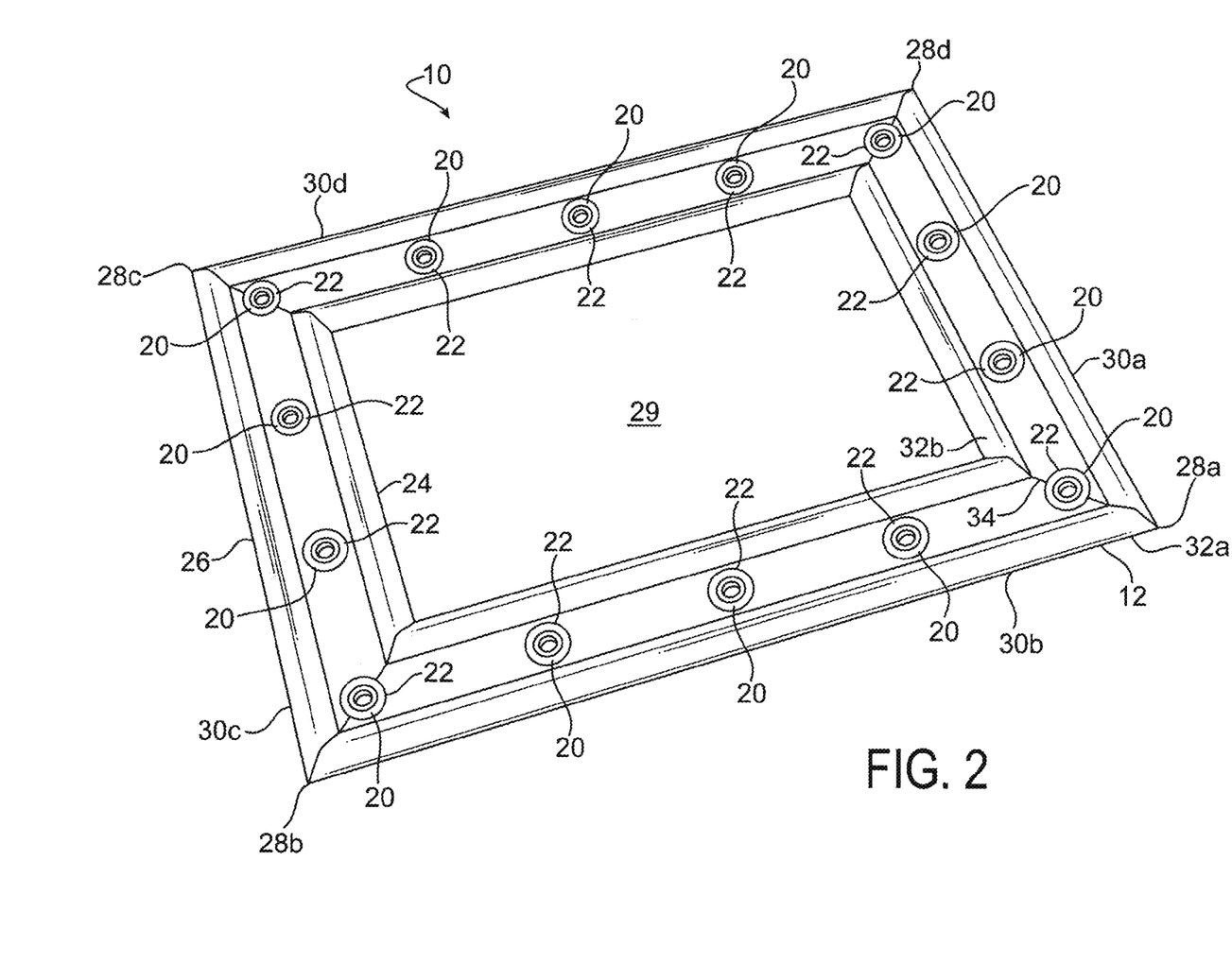
FIG. 2 is a topside perspective view of an illustrative embodiment of a picture frame-type gasket construction according to the present invention.

The closed or other geometry of body 12 may be constructed of a number of individual, elongate strips, 30a-d, each of which may be extruded, molded, or otherwise formed. Turning now to the detail of corner 28a shown in FIG. 2, each of the strips 30 has a first end, reference at 32a for strip 30a, and a second end, referenced at 32b for strip 30b, which is vulcanized, bonded, or otherwise joined to the first end 32a of strip 30a along a splice, 34, having a first side, 36a, and a second side, 36b.

Figure 4:
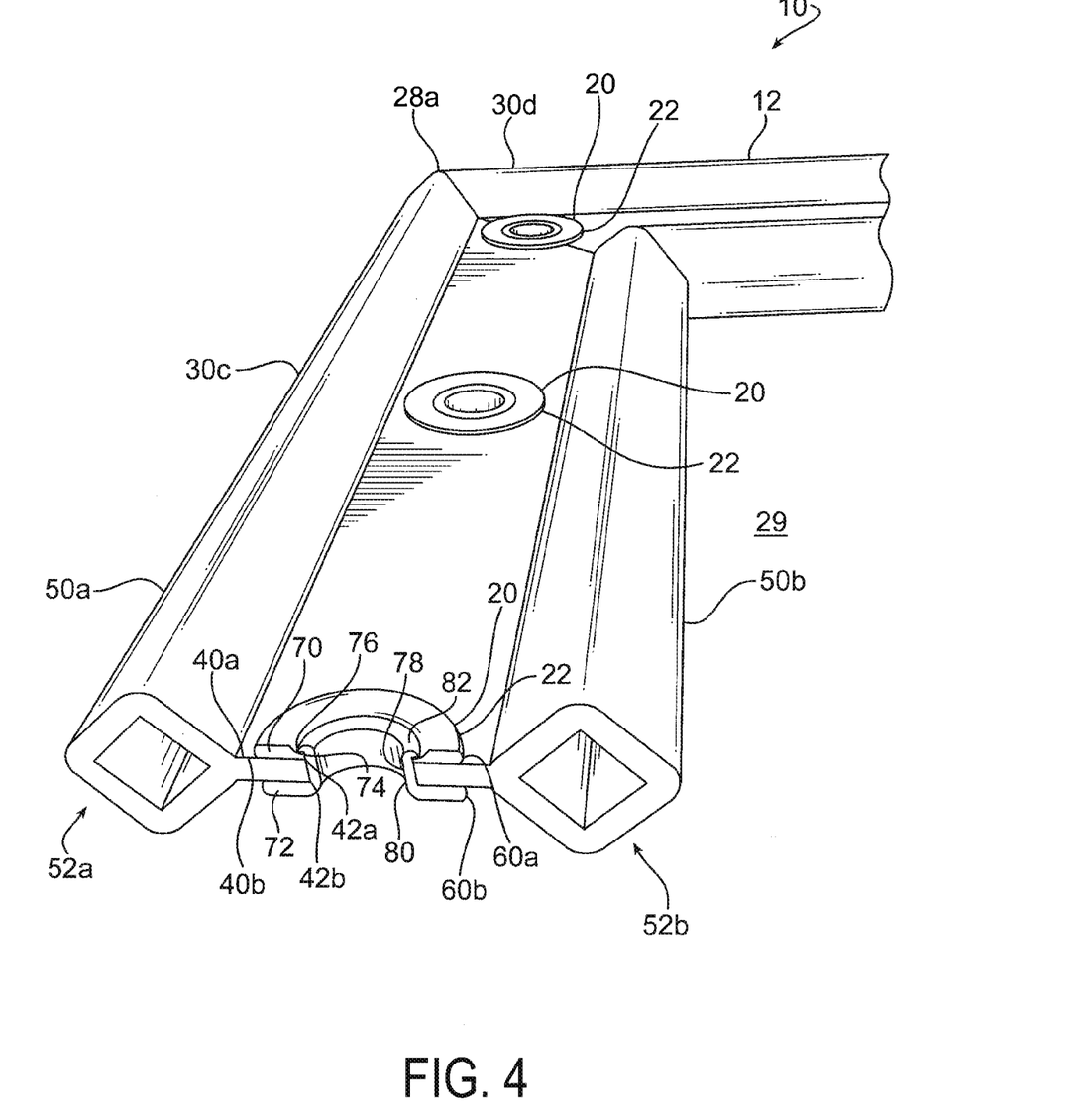
FIG. 4 is a topside perspective view in end cross-section of the gasket of FIG. 2.

Looking next to the cross-section view of the detail adjacent corner 28c shown in FIG. 4, body 12 may be seen to be further formed as having a first side, 40a, and a second side, 40b, defining a thickness of the body 12 therebetween. Each of the apertures 22 thus extend through such thickness of body 12 from an opening, 42a, in the first side 40a to an opening, 42b, in the second side 40b.

Each of the strips 30 forming body 12 also may be seen, as shown for strip 30c in FIG. 4, to be further formed as having a first edge, 50a, and a second edge, 50b, which define a widthwise extent therebetween. One, or as shown, both of the edges 50 may be formed as at 52a-b as having a generally bulbous or other tubular profile. Such profile may be generally polygonal as shown or, alternatively, circular, elliptical, or other curved shape, D-shape, "finned" or P-shaped, or other shape.

As mentioned, each of the strips 30 forming body 12 may be extruded, molded, or otherwise formed. Alternatively, body 12 may be molded, such as by injection, compression, transfer, or other molding, as a unitary part. In either construction, body 12 may be formed of a rubber or other elastomeric material which may be selected specifically for high or low temperature performance, flexibility, and otherwise for compatibility with the fluid being handled. Suitable materials, which may be filled, for example, with glass or carbon black, or which may be unfilled, include natural rubbers such as Hevea and thermoplastic, i.e., melt-processible, or thermosetting, i.e., vulcanizable, synthetic rubbers such as: fluoro- or perfluoroelastomers, chlorosulfonate, polybutadiene, butyl, neoprene, nitrile, polyisoprene, buna-N, copolymer rubbers such as ethylene-propylene (EPR), ethylene-propylene-diene monomer (EPDM), acrylonitrile-butadiene (NBR or HNBR) and styrene-butadiene (SBR), and blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyolefins, polyesters, ethylene vinyl acetates, fluoropolymers, and polyvinyl chloride. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Figure 3:
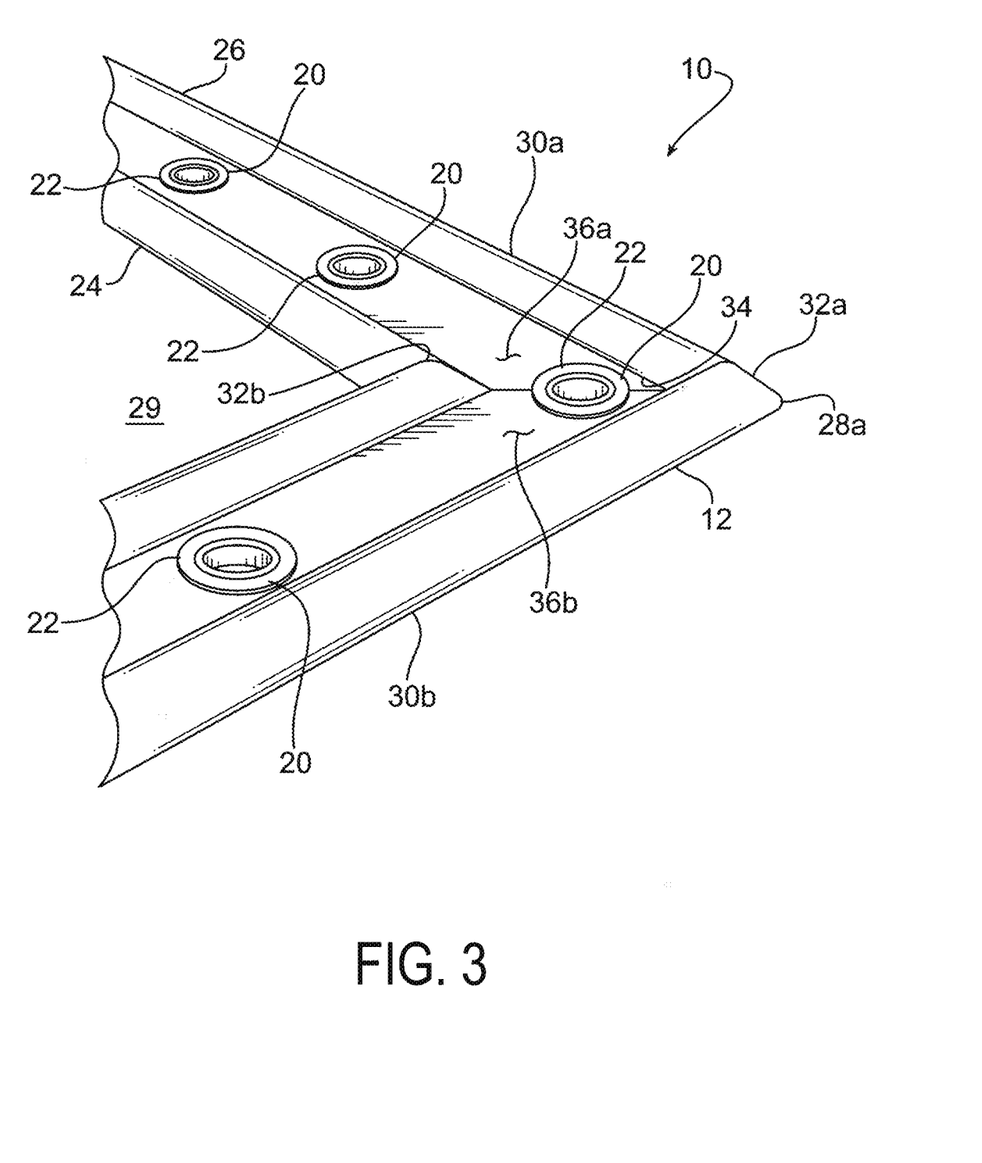
FIG. 3 an enlarged, fragmentary topside perspective view of a corner detail of the gasket of FIG. 2.

With continuing reference to FIG. 4, each of the compression limiters 20 is provided to extend through the thickness dimension of body 12 a first flanged portion, 60a, disposed about the opening 42a in the body first side 40a and extending radially outwardly thereover to a second flanged portion, 60b, disposed about the opening 42b in the body second side 40b and extending radially-outward thereover. As so provided, the thickness dimension of body 12 may be clamped between the flanged portions 60a-b to thereby mechanically fasten the limiters 20 to body 12 without the need for adhesives. With momentary to reference to FIG. 3, it may be seen for corner 28a that the limiters 20 at the corners 28 may be arranged to clamp the body 12 on each of the sides 36a-b of the splices 34 to thereby strengthen the bondline or other joint at those splices.

Figure 5A:
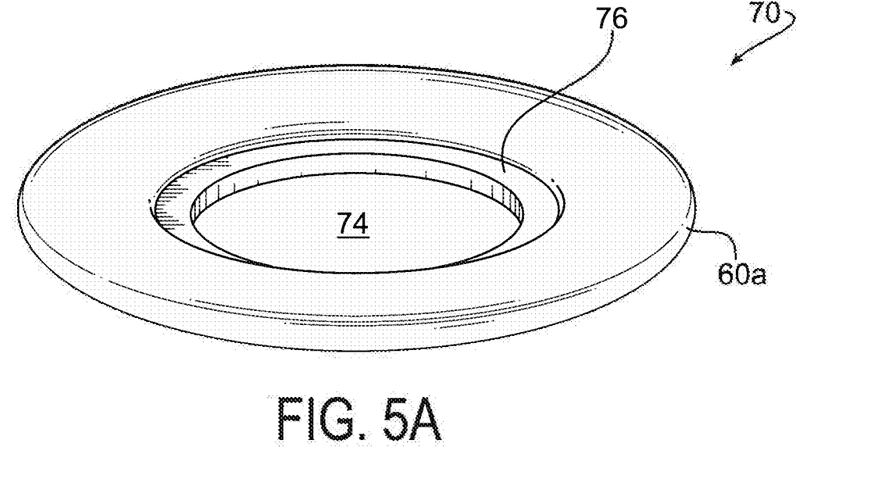
FIG. 5A is a perspective topside view of one-half of an illustrative 2-piece grommet assembly for use as the compression limiters of the gasket of FIG. 1.
Figure 5B:
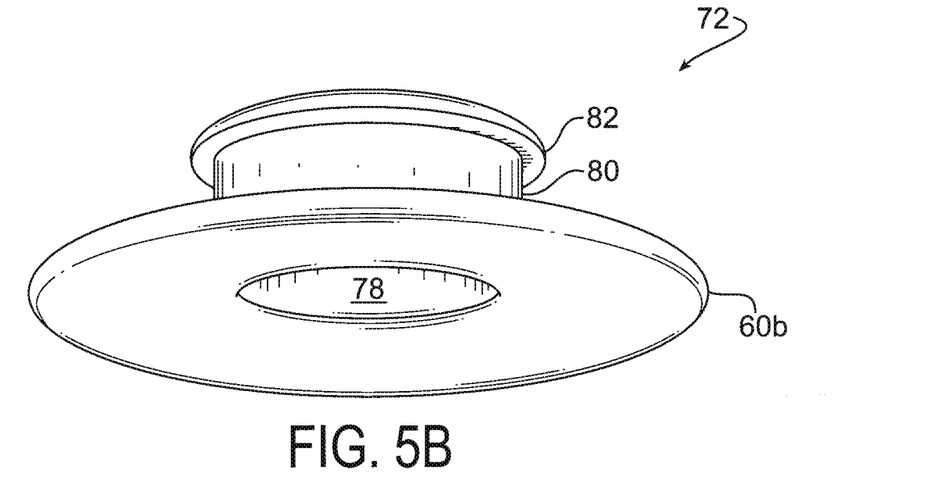
FIG. 5B is a perspective topside view of the other half of the grommet assembly of FIG. 5A.

For ease of installation into a corresponding one of the apertures 22 which may be punched or otherwise pre-formed through the body 12, each of the limiters 20 may be provided as a two-piece assembly, commonly known as a grommet, which may be formed of a plastic or metal such as a stainless steel, or of a plastic or metal alloy or blend, or of a composite or combination of such plastics, metals, alloy, or blends. Such assembly includes a generally annular first member, 70, which includes the first flanged portion 60a, and a second member, 72, which includes the second flanged portion 60b, with the second member 72 being staked, swaged, pressed, or otherwise fitted onto the first member 70. In this regard, and with additional reference to FIGS. 5A and 5B wherein perspective views of first member 70 (FIG. 5A) and second member 72 (FIG. 5B) are shown, first member 70 may be seen in FIGS. 4 and 5A to have an opening, 74, for general coaxial alignment with opening 42a, and an inner channel, 76, which surrounds the opening 74. In turn, second member 72 may be seen in FIGS. 4 and 5B to have an opening, 78, for general coaxial alignment with opening 42b, and a shank, 80, which extends from the second flanged portion 60a through the aperture 22 (FIG. 4) to a distal end, 82. As pressed or otherwise fitted onto the first member 70, distal end 82 of second member 72 may be formed as a rim or boss which is received into channel 76 or which is otherwise fitted over the opening 74 of first member 70 (FIG. 5A) to thereby interlock the members 70 and 72 together as shown in FIG. 4. Grommets suitable for use as the limiters 20 are manufactured commercially by Fasnap Corp. (www.fasnap.com). Presses for attaching such grommets are shown, for example, in U.S. Pat. Nos. 6,006,423 and 5,282,303.

Figure 6:
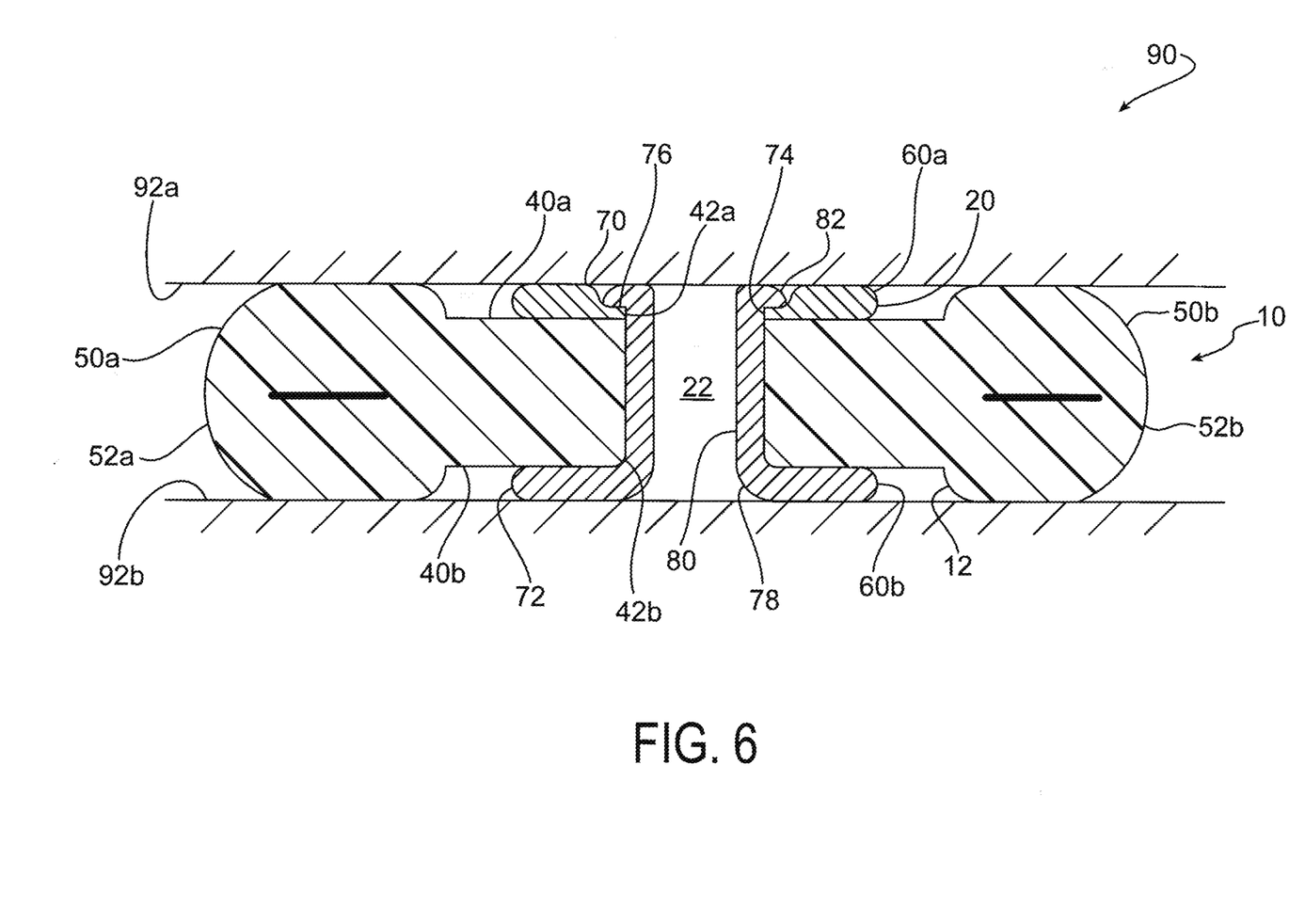
FIG. 6 is a schematic cross-sectional view showing the gasket of FIG. 2 as compressed between a pair of mating surfaces.

Turning lastly to FIG. 6, a representative sealing assembly is shown generally at 90 with gasket 10 being compressed between a pair of mating, faying, or otherwise interfacing surfaces, 92a-b. In such assembly 90, the tubular portions 52a-b of body 12 are deflected so as to provide a fluid-tight or other seal between the surfaces 90 and the edges 50 of the body 12. However, such compression is delimited or otherwise controlled by the abutting engagement of each of the surfaces 92a-b against a corresponding one of the flanged portions 60a-b of the compression limiter 20.

Thus, a unique gasket construction for commercial, industrial, military, or other applications is described which exhibits reliable sealing properties and which is able to incorporate integral compression limiters without the use of adhesives.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A gasket compressible between a first and a second interfacing surface, the gasket in an uncompressed orientation comprising:

a body formed of a resilient material, the body having a first side and a second side defining a body thickness therebetween and a first edge and a second edge defining a widthwise extent therebetween, one or both of the first and the second edge being formed as a having a generally tubular profile, and the body having one or more apertures extending through the body thickness from an opening in the first side to an opening in the second side; and one or more generally tubular compression limiters each received in a corresponding one of the apertures, each of the limiters being formed of a rigid material and extending through the body thickness from a first flanged portion disposed about the opening in the body first side and extending radially outwardly over the body first side to a second flanged portion disposed about the opening in the body second side and extending radially-outward over the body second side, the first and the second flanged portion of the limiters clamping the body thickness directly therebetween to thereby fasten the limiters to the body, each of the limiters comprising a first member including the first flanged portion, and a second member including the second flanged portion, the second member being fitted onto the first member, the first member having an opening aligned generally coaxially with the corresponding opening in the body first side, the second member having a shank portion extending from the second flanged portion through the corresponding one of the apertures to a distal end, and the distal end of the second member being received through the opening in the first member and fitted thereover interlocking the second member to the first member without deforming the body, whereby as the profile of the one or both of the first and the second edge of the gasket body is compressed between the first and the second interfacing surface, each of the first and the second interfacing surface abuttingly engages a corresponding one of the first and the second flanged portion of each of the compression limiters to thereby delimit the further compression of the profile of the one or both of the first and the second edge of the gasket body therebetween the first and the second interfacing surface, and to delimit the compression of the gasket body between the first and the second edge thereof such that each of the first and the second flange portion extends radially-outwardly over, respectively, the body first side and the body second side.

2. The gasket of claim 1 wherein the body has a lengthwise extent which defines a closed geometric area having an inner perimeter and an outer perimeter.

3. The gasket of claim 1 wherein the profile of the one or both of the first and the second edge is generally tubular.

4. The gasket of claim 1 wherein the body has a lengthwise extent, the apertures being disposed in a series along the lengthwise extent.

5. The gasket of claim 1 wherein the wherein:

the body is formed of at least a first strip portion having a first end and a second strip portion having a second end joined to the first end of the first strip portion along a splice having a first side and a second side, and a first one of the apertures extends through splice, the first and the second flanged portion of the one of the limiters being received in the first one of the apertures clamping the body thickness therebetween on each of the first and the second side of the splice.

6. The gasket of claim 1 wherein the resilient material forming the body is an elastomer.

7. The gasket of claim 1 wherein the rigid material forming the limiters is a metal or plastic, a metal or plastic alloy or blend, or a composite or combination thereof.

8. The gasket of claim 1 wherein:
the limiter first member has an inner channel surrounding the opening; and
the distal end of the limiter second member is received in the first member inner channel to thereby interlock the second member to the first member.

9. A sealing assembly comprising:
a gasket compressible between the first and the second interfacing surfaces, the gasket comprising in an uncompressed orientation:
a body formed of a resilient material, the body having a first side and a second side defining a body thickness therebetween and a first edge and a second edge defining a widthwise extent therebetween, one or both of the first and the second edge being formed as a having a generally tubular profile, and the body having one or more apertures extending through the body thickness from an opening in the first side to an opening in the second side; and
one or more generally tubular compression limiters each received in a corresponding one of the apertures, each of the limiters being formed of a rigid material and extending through the body thickness from a first flanged portion disposed about the opening in the body first side and extending radially outwardly over the body first side to a second flanged portion disposed about the opening in the body second side and extending radially-outward over the body second side, the first and the second flanged portion of the limiters clamping the body thickness directly therebetween to thereby fasten the limiters to the body, each of the limiters comprising a first member including the first flanged portion, and a second member including the second flanged portion, the second member being fitted onto the first member, the first member having an opening aligned generally coaxially with the corresponding opening in the body first side, the second member having a shank portion extending from the second flanged portion through the corresponding one of the apertures to a distal end, and the distal end of the second member being received through the opening in the first member and fitted thereover interlocking the second member to the first member without deforming the body,
whereby as the profile of the one or both of the first and the second edge of the gasket body is compressed between the first and the second interfacing surface, each of the first and the second interfacing surface abuttingly engages a corresponding one of the first and the second flanged portion of each of the compression limiters to thereby delimit the further compression of the profile of the one or both of the first and the second edge of the gasket body therebetween the first and the second interfacing surface, and to delimit the compression of the gasket body between the first and the second edge thereof such that each of the first and the second flange portion extends radially-outwardly over, respectively, the body first side and the body second side.

10. The sealing assembly of claim 9 wherein the body has a lengthwise extent which defines a closed geometric area having an inner perimeter and an outer perimeter.

11. The sealing assembly of claim 9 profile of the one or both of the first and the second edge being formed as a having a generally tubular.

12. The sealing assembly of claim 9 wherein the body has a lengthwise extent, the apertures being disposed in a series along the lengthwise extent.

13. The sealing assembly of claim 9 wherein the wherein:
the body is formed of at least a first strip portion having a first end and a second strip portion having a second end joined to the first end of the first strip portion along a splice having a first side and a second side, and
a first one of the apertures extends through splice, the first and the second flanged portion of the one of the limiters being received in the first one of the apertures clamping the body thickness therebetween on each of the first and the second side of the splice.

14. The sealing assembly of claim 9 wherein the resilient material forming the body is an elastomer.

15. The sealing assembly of claim 9 wherein the rigid material forming the limiters is a metal or plastic, a metal or plastic alloy or blend, or a composite or combination thereof.

16. The sealing assembly of claim 9 wherein:
the limiter first member has an inner channel surrounding the opening; and
the distal end of the limiter second member is received in the first member inner channel to thereby interlock the second member to the first member.

* * * * *